United States Patent [19]
Hoshino

[11] Patent Number: 4,969,048
[45] Date of Patent: Nov. 6, 1990

[54] IMAGE RECORDER HAVING SPECIFIC SHEET TRAY WITH HOPPER AND DISCHARGE PORTIONS

[75] Inventor: Seiji Hoshino, Atsugi, Japan

[73] Assignee: Ricoh Company, Ltd., Tokyo, Japan

[21] Appl. No.: 455,149

[22] Filed: Dec. 22, 1989

[30] Foreign Application Priority Data

Dec. 27, 1988 [JP] Japan ................... 63-167575

[51] Int. Cl.⁵ .................. H04N 1/23; B41J 13/00; B41J 13/01
[52] U.S. Cl. ..................... 358/296; 355/309; 358/498; 358/496; 358/401; 346/134
[58] Field of Search ............ 358/296, 474, 494, 496, 358/498, 401, 476; 355/309; 346/134; 400/578, 624, 625

[56] References Cited

U.S. PATENT DOCUMENTS 3,600,082 8/1971 Knechtel .................. 355/309
4,823,195 4/1989 Ito ........................ 358/494

FOREIGN PATENT DOCUMENTS 62-32864  8/1987 Japan .................. 358/498
62-41007 10/1987 Japan .................. 358/498
63-29331  8/1988 Japan .................. 358/498

Primary Examiner—Bruce A. Reynolds
Assistant Examiner—Scott A. Rogers
Attorney, Agent, or Firm—Oblon, Spivak, McClelland, Maier & Neustadt

[57] ABSTRACT

An image recording apparatus includes a main body having a document insertion inlet, a sheet tray provided to the main body and having a hopper portion, a recording sheet discharge portion and a document discharge portion, the hopper portion, the recording sheet discharge portion and the document discharge portion arranged so as to be stacked with space, the main body having a document conveyor path coupling the document insertion inlet and the document discharge portion of the sheet tray, a document image read device reading images upon the document sheet, a recording sheet conveyor path coupling the hopper portion and the recording sheet discharge portion, and an image recording device recording images on a recording sheet.

12 Claims, 2 Drawing Sheets

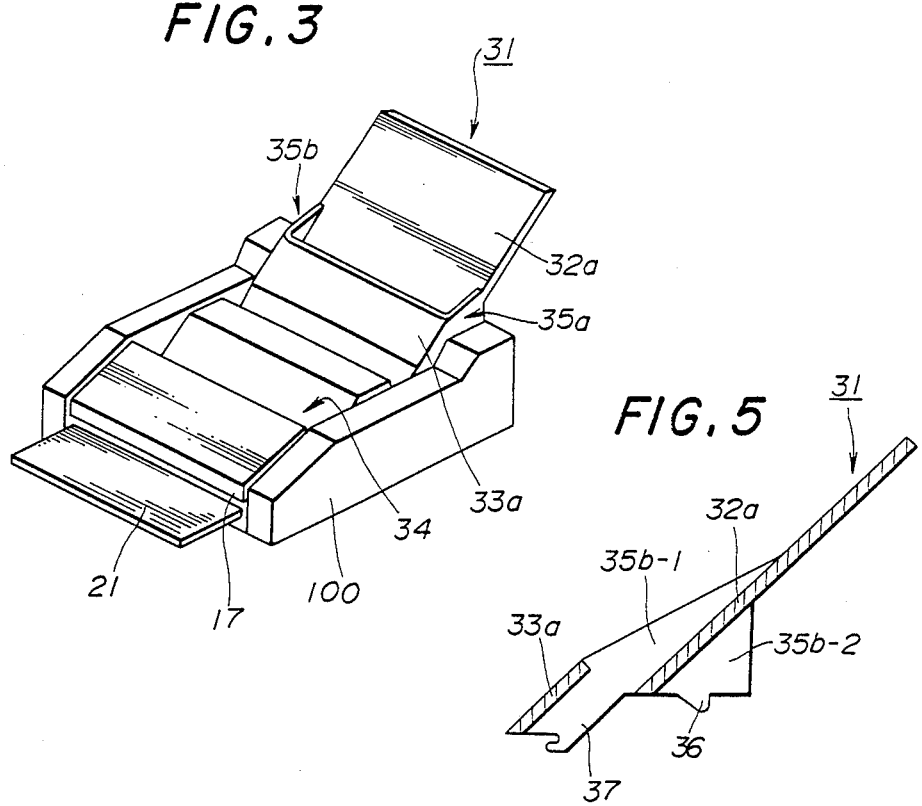
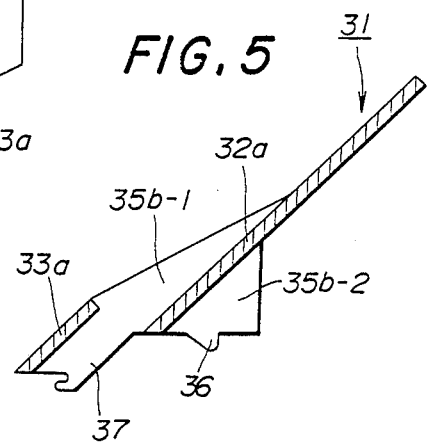
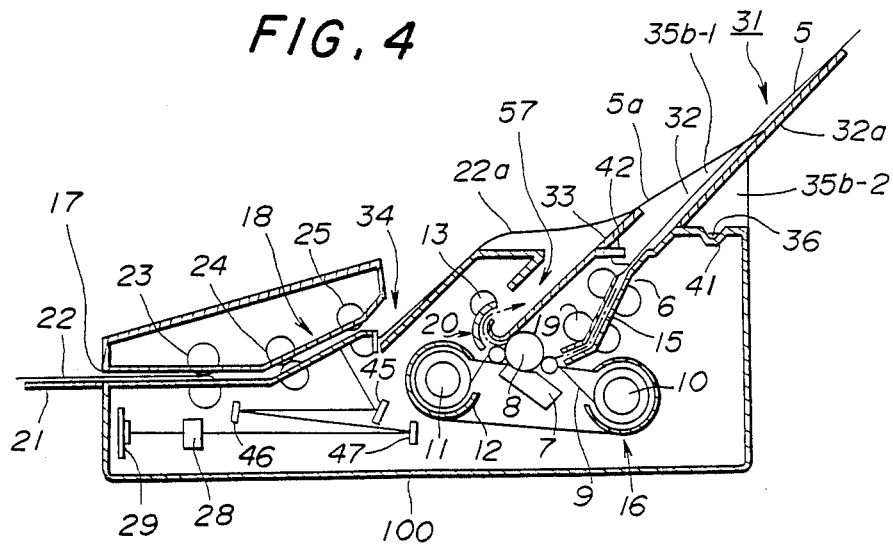

IMAGE RECORDER HAVING SPECIFIC SHEET TRAY WITH HOPPER AND DISCHARGE PORTIONS

BACKGROUND OF THE INVENTION

The present invention relates to an image recording apparatus such as a facsimile machine, and more particularly to an image recording apparatus having an improved sheet tray to receive recording sheets and document sheets, etc.

Many types of sheet trays for facsimile machines and the like have been proposed. For example, the facsimile machine disclosed in Japanese Utility Model Publication No. 41007/1987 has a single sheet tray for both recording sheets that are recorded upon, and document sheets. In addition, the facsimile machine disclosed in Japanese Utility Model Publication No. 32864/1987 has a sheet tray that receives recording sheets recorded upon and functions as a sheet hopper for inserting the document sheet to the facsimile machine by hand. In Japanese Utility Model Publication No. 29331/1988 there is disclosed a facsimile machine provided with a document sheet tray above a recording sheet tray and having a small amount of protrusion so that the end portion of document sheets protruding from the document sheet tray are supported by the recording sheet tray. Thus, conventional facsimile machines have had their size and cost made smaller with the same tray used for both types of sheet.

Conventional facsimile machines and the like have not had sufficient mutual connection between the hopper for supplying the recording sheets, the recording sheet discharge tray and the document sheet discharge tray, and significant advances in lowering the cost and in reducing the space taken have not been possible. In addition, thermal transfer facsimile machines that use ink-donor film become particularly high because of the need to mount a cassette housing the ink-donor film.

SUMMARY OF THE INVENTION

Accordingly, it is a general object of the present invention to provide a novel and useful image recording apparatus in which the problems described heretofore are eliminated.

A more specific object of the present invention is to provide an image recording apparatus that has mutual linking between the hopper in which the recording sheets are set, the recording sheet discharge tray and the document discharge tray, and which also has a reduced cost and a smaller apparatus size.

The above objects are achieved by an image recording apparatus, comprising a main body having a document insertion inlet into which document sheets are inserted, a sheet tray provided to the main body and having a hopper portion in which recording sheets cut to a predetermined size are set, a recording sheet discharge portion to receive the recording sheets upon which recording has been performed, and a document discharge portion to receive the document sheets, the hopper portion, the recording sheet discharge portion and the document discharge portion being arranged so as to be stacked, a document conveyor path coupling the document insertion inlet and the document discharge portion of the sheet tray and conveying the recording sheet from the document insertion inlet to the recording sheet discharge portion, and provided with a document image read means for reading images upon the document sheet, and a recording sheet conveyor path coupling the hopper portion and the recording sheet discharge portion and conveying the recording sheet from the hopper portion to the recording sheet discharge portion, and provided with an image recording means for recording images on a recording sheet inside the recording sheet conveyor path.

The aforementioned objects of the present invention are also achieved by an image recording apparatus, comprising a main body having a document insertion inlet into which document sheets are inserted, a sheet tray detachably provided to the main body and having a hopper portion in which recording sheets cut to a predetermined size are set, and a recording sheet discharge portion to receive the recording sheets upon which recording has been performed, the hopper portion and the recording sheet discharge portion being arranged so as to be stacked, a document discharge portion to receive document sheets, formed in the main body, and having an opening portion in the vicinity of the sheet tray, a document conveyor path coupling the document insertion inlet and the document discharge portion, conveying the document sheet from the document insertion inlet to the document discharge portion and provided with a document image read means for reading images upon the document sheet, and a recording sheet conveyor path coupling the hopper portion and the recording sheet discharge portion, and provided with an image recording means for recording images on a recording sheet inside the recording sheet conveyor path, whereby a leading end of a document sheet discharged from the document conveyor path to the document discharge portion is received by the sheet tray.

BRIEF DESCRIPTION OF THE DRAWINGS

FIG. 3 is a perspective view of a facsimile machine according to a second embodiment of the present invention;

FIG. 4 is a sectional view of the facsimile machine of the second embodiment;

FIG. 5 is a sectional view of a sheet tray that can be mounted and dismounted to and from a facsimile machine.

DESCRIPTION OF THE PREFERRED EMBODIMENTS

Figure 1:
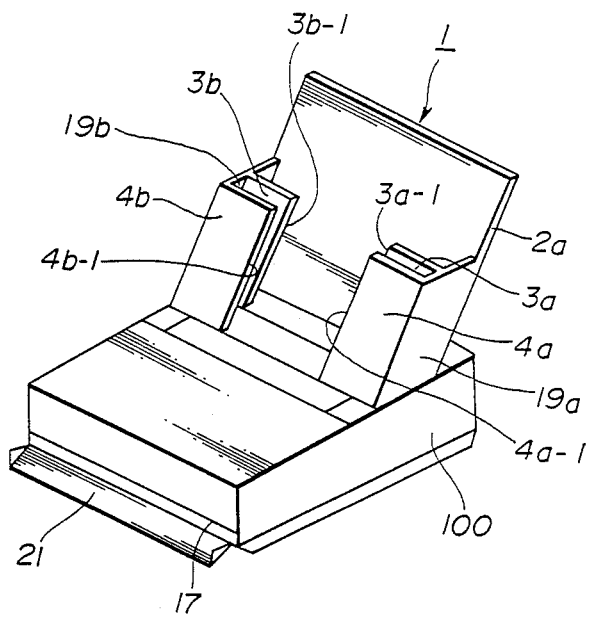
FIG. 1 is a perspective view of a facsimile machine according to a first embodiment of the present invention.
Figure 2:
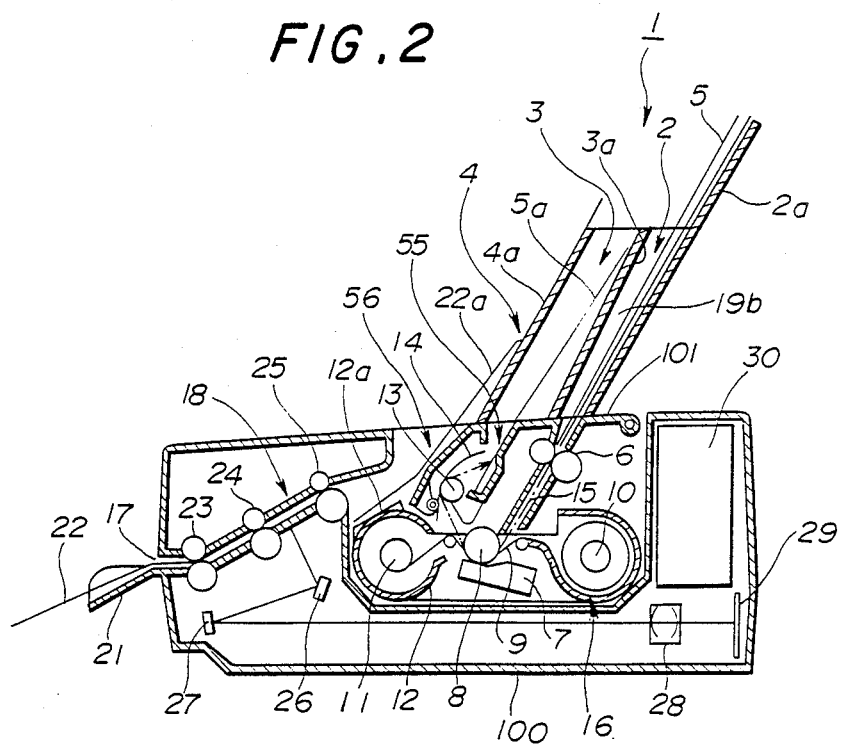
FIG. 2 is a sectional view of the facsimile machine of the first embodiment.

FIGS. 1 and 2 illustrate a facsimile machine according to a first embodiment of the present invention. The illustrated facsimile machine employs a conventional thermal transfer process.

Referring to FIGS. 1 and 2, a sheet tray 1 has a hopper plate 2a. Side plates 19a and 19b project from both side ends of the hopper plate 2a. The side plates 19a and 19b have a shorter length than the hopper plate 2a. A supporting plate 3a is located on a middle portion of the side plate 19a and projects there from toward the opposite side plate 19b. A supporting plate 3b is located on a middle portion of the side plate 19b and projects there from, and a side end 3b-1 thereof confronts to a side end 3a-1 of the supporting plate 3a. The supporting plates 3a and 3b are the same longitudinal length as the side plates 19a and 19b and widths of the supporting plates 3a and 3b are shorter than half the width of the hopper plate 2a.

Supporting plates 4a and 4b which are of the same shape as the supporting plates 3a and 3b are located on ends of the side plates 19a and 19b at a distance from the supporting plates 3a and 3b and project from them. Side ends 4a-1 and 4b-1 of the supporting plates 4a and 4b confront each other. The supporting plates 3a, 3b, 4a and 4b are parallel to the hopper plate 2a. The hopper plate 2a and the supporting plates 3a, 3b, 4a and 4b are integrally formed of plastic for example.

The hopper plate 2a and a space enclosed by the hopper plate 2a, the supporting plates 3a, 3b and the side plates 19a, 19b form a hopper portion 2 of the sheet tray 1. The supporting plates 3a, 3b and a space enclosed by the supporting plates 3a, 3b, 4a and 4b and the side plates 19a, 19b form a recording sheet discharge portion 3 of the sheet tray 1. The supporting plate 4a, 4b form a document discharge portion 4 of the sheet tray 1.

Recording sheets (ordinary plain paper in this embodiment) cut to a predetermined size are set in the hopper portion 2. The recording sheet discharge portion 3 receives the recording sheets that have been recorded upon, and the document discharge portion 4 receives the document sheets. The sheet tray 1 is provided on the top surface of the facsimile main body 100 so that it is inclined at a predetermined angle. The sheet tray 1 is integrated with a top cover plate 101 of the facsimile main body 100.

In a modification of the structure described above, the sheet tray 1 is not integrated with the top cover plate 101. In the modification, the sheet tray 1 is screwed on the top cover plate 101 for example.

In the facsimile main body 100, a supporting part 55 linking to the recording sheet discharge portion 3 of the sheet tray 1 is formed. The hopper portion 2 of the sheet tray 1 and the supporting part 55 are coupled through a recording sheet coveyor path 15 (shown by a one-dotted chain line in the figure). A portion where a recording sheet 5 enters the recording sheet coveyor path 15 from the hopper portion 2 of the sheet array 1 is provided with sheet supply rollers 6. These sheet supply rollers 6 separate and feed a plural number of recording sheets 5 that have been stacked and set in the hopper portion 2 of the sheet tray 1, one at a time to the recording sheet conveyor path 15.

A lower portion of the sheet supply rollers 6 is provided with a thermal transfer recording unit 16 for recording image on the recording sheet 5. The thermal transfer recording unit 16 has a thermal head 7, a platen roller 8 and ink donor film 9 housed inside a cassette 12. Inside the cassette 12 is provided a supply shaft 10 and a take-up shaft 11 provided on opposite sides of the platen roller 8. The ink donor film 9 is wound from the supply shaft. 10 through between the thermal head 7 and the platen roller 8 to the take-up shaft 11. The recording sheet 5 that moves inside the recording sheet conveyor path 15 passes between the platen roller 8 and the ink donor film 9.

In a portion where a recording sheet 5 is discharged from the recording sheet conveyor path 15 to the supporting part 55 are provided a sheet discharge roller 13 and a sheet discharge plate spring 14. As a result of the sheet discharge roller 13 and the sheet discharge plate spring 14, recording sheets 5 that have been recorded upon, are discharged regularly to the supporting part 55 and the recording sheet discharge portion 3 of the sheet tray 1.

The front end surface of the facsimile main body 100 is formed with a document sheet insertion inlet 17. The lower portion of the document sheet insertion inlet 17 is provided with a document tray 21 projecting from the facsimile main body 100. In the facsimile main body 100, another supporting part 56 linking to the document discharge portion 4 of the sheet tray 1 is formed. The lower portion of the supporting part 56 is formed by a portion 12a of the cassette 12 housing the ink donor film 9. The document sheet insertion inlet 17 and the supporting part 56 are connected through a document conveyor path 18. In the document conveyor path 18 into which document sheets are inserted from the document sheet insertion inlet 17 is provided document supply rollers 23 that separate and feed a plural number of document sheets 22 intermittently and one at a time to the document conveyor path 18. Inside the document conveyor path 18 are provided conveyor rollers 24 and 25 that convey the document sheets 22 toward the supporting part 56 for every sheet at a time.

In the facsimile main body 100 is provided an image read unit that optically reads the images on the document sheet 22 that moves inside the document conveyor path 18. This image read unit has mirrors 26 and 27, a lens 28 and a read sensor 29 such as a CCD or the like, so that light from a light source is reflected by the document sheet 22 and is the focused on the read sensor 29 via the mirrors 26 and 27, and the lens 28. The image data that is read by the read sensor 29 is transferred to a different facsimile machine via communications lines.

The read end portion of the facsimile main body 100 is provided with a power source 30 for the facsimile machine.

When image data is sent by the facsimile machine having a configuration such as has been described above, the document sheets 22 that have been set inside the document tray 21 are sent one at a time from the document insertion inlet 17 to the document conveyor path 18, and the document sheets 22 inside the document conveyor path 18 are conveyed. Then, when a document sheet 22 passes a read position, the image on the document sheet 22 is read by the read sensor 29 via the optical system (comprising the mirrors 26 and 27, and the lens 28). The read image data is then transferred via communications circuits to another facsimile machine. After reading has finished, a document sheet 22a that have been read is moved inside the document conveyor path 18 and is discharged by the conveyor rollers 25 from document conveyor path 18 to the supporting part 56 and the document discharge portion 4 of the sheet tray 1. The document discharge portion 4 of the sheet tray 1 successively receives document sheets 22a that have read and discharged from the document conveyor path 18. The supporting part 56 supports a rear end portion of the document sheet entirely discharged from the document conveyor path 18.

When the facsimile machine receives image data, the recording sheets 5 that have been set in the hopper portion 2 of the sheet tray 1 are conveyed one at a time to the recording sheet conveyor path 15 and a recording sheet 5 in the recording sheet conveyor path 15 is conveyed. Then, the recording sheet 5 is made to overlap the ink donor film 9 and sent between the platen roller 8 and the thermal head 7. To accompany the movement of the recording sheet 5, the ink donor film 9 is sent between the platen roller 8 and the thermal head 7. To accompany the movement of the recording sheet 5, the ink donor film 9 is wound from the supply shaft 10 to the take-up shaft 11 at a speed which is the same as the speed of conveyance of the recording sheets 5. When a recording sheet 5 passes between the platen roller 8 and the thermal head 7, the heating elements of the thermal head 7 are selectively heated in accordance with the recording signals corresponding to the image data that has been received. The ink on portions of the ink donor film 9 that are in contact with the heated heating elements of the thermal head 7, is melted and that melted ink is transferred to the recording sheet 5. The transfer of the ink from the ink donor film 9 in accordance with the image data, to the conveyed recording sheet 5 forms the image on the recording sheet 5.

A recording sheet 5a upon which recording has been performed, passes between the sheet discharge roller 13 and the sheet discharge plate spring 14 and is discharged from the recording sheet conveyor path 15 to the supporting part 55 and the recording sheet discharge portion 3 of the sheet tray 1. The recording sheet discharge portion 3 of the sheet tray 1 receives the recording sheet 5a upon which recording has been performed and successively discharged from the recording sheet conveyor path 15. The supporting part 55 supports a rear end portion of the recording sheet 5a which has completely been discharged from the recording sheet conveyor path 15.

The facsimile machine of the embodiment described above, is provided with the sheet tray 1 having the hopper portion 2 in which recording sheets 5 are set, the recording sheet discharge portion 3 that receives the recording sheets 5a and the document discharge portion 4 that receives document sheets 22a that have been read. Further the hopper portion 2, the recording sheet discharge portion 3 and the document discharge portion 4 are arranged so as to be stacked. Accordingly, the amount of space taken up by the trays is less that of conventional facsimile machines and the facsimile machine itself can be made both more compact and less expensive.

In addition, in the facsimile machine of the embodiment described above, the bottom portion of the supporting part 56 in the facsimile main body 100 is partially configured from the cassette 12 housing the ink donor film 9. Accordingly, the height of a facsimile machine of the embodiment described above, is less and the unit itself is more compact than a conventional facsimile machine where the bottom portion of the supporting part 56 is configured from a different material and is disposed still further above the cassette 12.

In the sheet tray 1, since the supporting plates 3a and 3b are separated, it is easy to take out the recording sheets 5a received in the recording sheet discharge portion 3 of the sheet tray 1.

It is easy to take out the document sheets 22a received on the document discharge portion 4 of the sheet tray 1, due to separation of the supporting plates 4a and 4b.

Alternatively the supporting plate 3a may be integrated with the supporting plate 3b, and the supporting plate 4a may be integrated with the supporting plate 4b.

In an alternative, the recording sheet discharge portion 3 of the sheet tray 1 includes the supporting part 55, and the document discharge portion 4 of the sheet tray 1 includes the supporting part 56. In these cases, the recording sheet conveyor path 15 is directly connected to the recording sheet discharge portion 3 of the sheet tray 1, and the document conveyor path 18 is directly connected to the document discharge portion 4 of the sheet tray 1.

FIGS. 3, 4 and 5 illustrate a facsimile machine according to a second embodiment of the present invention. In FIG. 3, FIG. 4 and FIG. 5, the portions that are the same as similar portions in FIG. 1 and FIG. 2 are indicated using the same reference numbers.

A sheet tray 31 has a hopper plate 32a, a supporting plate 33a and side plates 35a, 35b. The hopper plate 32a has an enough area to support a recording sheet. The supporting plate 33a has a rather shorter length than the hopper plate 32a. The side plates 35a and 35b are formed by first portions 35a-1, 35b-1 and second portions 35a-2, 35b-2. The side plates 35a and 35b are located on side ends of the hopper plate 32a, and the first portions 35a-1, 35b-1 of the side plates 35a, 35b project from a right side of the hopper plate 32a, and the second portions 35a-2, 35b-2 of the side plates 35a, 35b project from the reverse of the hopper plate 32a. The hopper plate 32a and the supporting plate 33a are inclined at a predetermined angle and the supporting plate 33a is parallel to the hopper plate 32a. The supporting plate 33a is supported on the first portions 35a-1, 35b-1 of the side plates 35a, 35b so that the supporting plate 33a is located at a distance from the hopper plate 32a. The hopper plate 32a, the supporting plate 33a and the side plates 35a, 35b are integrally formed of plastic for example.

The hopper plate 32a and a space enclosed by the hopper plate 32a, the supporting plate 33a and the side plates 35a, 35b form a hopper portion 32 of the sheet tray 31. The supporting plate 33a forms a recording sheet discharge portion 33 of the sheet tray 31.

Recording sheets cut to a predetermined size are set in the hopper portion 32 of the sheet tray 31. The recording sheet discharge portion 33 of the sheet tray 31 receives recording sheets 5a that have been recorded upon. Lower edges of the first portions 35a-1, 35b-1 of the side plates 35a, 35b are formed with lugs 37, and lower edges of the second portions 35a-2, 35b-2 of the side plates 35a, 35b are formed with protruding portions 36 for positioning.

The sheet tray 31 is mounted to the facsimile main body 100 by engaging the lugs 37 with a catch portion 42 formed in the top surface of the facsimile main body 100, and by engaging the protruding portions 36 with recessed portions 41 formed in the cover on the top surface of the facsimile main body 100. To the top to the facsimile main body 100 is detachably mounted a sheet tray 31. Accordingly, by applying pressure to the sheet tray 31 from the rear side of the sheet tray 31, the protruding portions 36 are released from the recessed portions 41 and the lugs 37 are released from the catch portions 42 by rotating the sheet tray 31 around its pivot. The sheet tray 31 can be separated from the facsimile main body 100 by releasing the lugs 37 from the catch portions 42.

In the facsimile main body 100, a supporting part 57 linking to the recording sheet discharge portion 33 of the sheet tray 31 is formed. The hopper portion 32 of the sheet tray 31 and the supporting part 57 are connected by a recording sheet conveyor path 15 as described previously for the first embodiment. Supply rollers 6 are provided at positions where the recording sheet 5 is fed into the recording sheet conveyor path 15 from the sheet tray 31, and conveyor rollers 19 are provided in the recording sheet conveyor path 15. A thermal transfer recording unit 16 is provided along the recording sheet conveyor path 15 and this thermal transfer recording unit 16 comprises a thermal head 7, a platen roller 8 and an ink donor film 9 wound around a supply shaft 10 and a take-up shaft 11 in a cassette 12 as in the first embodiment. A sheet discharge roller 13 and sheet discharge guide plate 20 are provided at a position where a recording sheet 5 upon which recording has been performed by the thermal transfer recording unit 16 is discharged from the recording sheet conveyor path 15 to the supporting part 57.

The facsimile main body 100 is formed with a document discharge portion 34 open to the top surface. The document discharge portion 34 is disposed in line with the recording sheet discharge portion 33 of the sheet tray 31 mounted to the facsimile main body 100. The longitudinal length of the portion of the document discharge portion 34 that receives the document sheets is shorter than the length of a normal document sheet (of A4 size, for example). The document insertion inlet 17 formed in the front end surface and the document discharge portion 34 are connected by a document conveyor path 18 in the same manner as described for the first embodiment. To the lower portion of the document insertion inlet 17 is provided a document tray 21. The document conveyor path 18 is provided with document supply rollers 23 and conveyor rollers 24 and 25, and to the lower portion of the document conveyor path 18 is disposed an image read unit having mirrors 45, 46 and 47, a lens 28, and a read sensor 29.

When the facsimile machine having such a configuration sends image data, the document sheets 22 successively fed one at a time from the document insertion inlet 17 are conveyed along the document conveyor path 18 and are discharged to the document discharge portion 34 after the images on the document sheet 22 have been read. The document discharge portion 34 receives the document sheets 22a that are discharged from the document conveyor path 18. The longitudinal length of the document discharge portion 34 is shorter than the length of a document sheet 22a so that the leading end of a document sheet that has been read reaches the sheet tray 31. This is to say that the recording sheet discharge portion 33 of the sheet tray 31 receives the leading end portion of a document sheet 22a that has been read. In addition, long document sheets 22 are received by the hopper portion 32 of the sheet tray 31 after they have been read.

When a facsimile machine having such a configuration receives image data, recording sheets 5 that are separated and fed one at a time from the hopper portion 32 of the sheet tray 31 are conveyed along the recording sheet conveyer path 15, have images formed upon them by the thermal transfer recording unit 16 and are then discharged to the supporting part 57 and the recording sheet discharge portion 33 of the sheet tray 31. The supporting part 57 supports recording sheets 5a successively discharged from the recording sheet conveyor path 15. And the recording sheet discharge portion 33 of the sheet tray 31 supports a leading end of the recording sheet 5a entirely discharged from the recording sheet conveyor path 15. When the length of a recording sheet 5 is longer than the longitudinal length of the recording sheet discharge portion 33 of the sheet tray 31, the leading end of a recording sheet 5a that has been recorded upon, reaches the hopper portion 32 of the sheet tray 31.

A facsimile machine having such a configuration is provided with a hopper portion 32 in which recording sheets are set, and a recording sheet discharge portion 33 to receive the recording sheets 5a that have been recorded upon. And the hopper portion 32 and the recording sheet discharge portion 33 are arranged so as to be stacked. In addition, the document discharge portion 34 open to the top surface of the facsimile main body 100 is formed in the facsimile main body 100, so that the leading end of a document sheet discharged to the document discharge portion 34 is received by the sheet tray 31. Accordingly, there is little space taken up by the tray itself and the size of the facsimile machine can be reduced along with the cost.

In addition, the sheet tray 31 can be detachably mounted to the facsimile main body 100 so that the sheet tray 31 can be easily removed from the facsimile main body 100 when an external force is applied. Accordingly, the sheet tray 31 separates from the facsimile main body 100 should it be bumped by a person or object, and therefore prevents damage to the facsimile main body 100.

The present invention is not limited to the aforementioned embodiments, and variations and modification may be made without departing from the scope of the invention.

For example, the present invention is not limited in its application to facsimile machines, and can be applied to OCR apparatus and other image reading devices, for example. In addition, the image recording means is not limited to thermal transfer units and can alternatively be a recording unit employing the electrostatic copying process for example.

What is claimed is:

1. An image recording apparatus comprising:
   a main body having a document insertion inlet into which document sheets are inserted; and
   a sheet tray provided to said main body, said tray having a hopper portion in which recording sheets are set, a recording sheet discharge portion to receive said recording sheets upon which recording has been performed, and a document discharge portion to receive said document sheets, said hopper portion, said recording sheet discharge portion, and said document discharge portion being arranged so as to be stacked with spaces;
   said main body including,
   a document conveyor path coupling said document insertion inlet and said document discharge portion of said sheet tray,
   means for conveying said recording sheet from said document insertion inlet to said document discharge portion,
   document image read means for reading images upon said document sheet,
   a recording sheet conveyor path coupling said hopper portion and said recording sheet discharge portion,
   means for conveying said recording sheet from said hopper portion to said recording sheet discharge portion, and
   image recording means for recording images on a recording sheet inside said recording sheet conveyor path.

2. The image recording apparatus as claimed in claim 1, wherein said sheet tray is provided on a top surface of said main body so as to be inclined at a predetermined angle.

3. The image recording apparatus as claimed in claim 1, wherein said main body has a first supporting member linking an end of said recording sheet conveyor path to said recording sheet discharge portion of said sheet tray, said first supporting member supporting a rear end portion of said recording sheet entirely discharged from said recording sheet conveyor path, and a second supporting member linking an end of said document conveyor path to said document discharge portion of said sheet tray, said second supporting member supporting a rear end portion of said document sheet entirely discharged from said document conveyor path.

4. The image recording apparatus as claimed in claim 1, wherein said image recording means includes a thermal transfer recording unit having a platen roller, a thermal head and an ink donor film housed in a cassette case, said recording sheet passing with said ink donor film between said platen roller and said thermal head.

5. The image recording apparatus as claimed in claim 4, wherein main body has a supporting member linking an end of said document conveyor path to said document discharge portion of said sheet tray, said supporting member having a portion formed by one portion of said cassette case and supporting a rear end of said document sheet entirely discharged from said document conveyor path.

6. An image recording apparatus comprising:
a main body having a document insertion inlet into which document sheets are inserted; and
a sheet tray detachably provided to said main body, said tray having a hopper portion in which recording sheets cut to a predetermined size are set and a recording sheet discharge portion to receive said recording sheets upon which recording has been performed, said hopper portion and said recording sheet discharge portion being arranged so as to be stacked with spaces;
said main body including,
a document discharge portion to receive said document sheets, said document discharge portion having an opening portion in the vicinity of said sheet tray,
a document conveyor path coupling said document insertion inlet and said document discharge portion,
means for conveying said document sheet from said document insertion inlet to said document discharge portion,
document image read means for reading images upon the document sheet,
a recording sheet conveyor path coupling said hopper portion and said recording sheet discharge portion, and
image recording means to record images on a recording sheet inside said recording sheet conveyor path,
whereby a leading end of a document sheet discharged from said document conveyor path to said document discharge portion is received by said sheet tray.

7. The image recording apparatus as claimed in claim 6, wherein said sheet tray is provided on a top surface of said main body so as to by inclined at a predetermined angle.

8. The image recording apparatus as claimed in claim 6, wherein said main body has a supporting member linking an end of said recording sheet conveyor path to said recording sheet discharge portion of said sheet tray, said supporting member supporting a rear end portion of said recording sheet entirely discharged from said recording sheet conveyor path.

9. The image recording apparatus as claimed in claim 6, wherein said sheet tray has catching lugs and protrusions formed at a lower end portion thereof, said main body has catching portions formed on the top surface of said main body so as to correspond to said catching lugs of said sheet tray, and recessed portions formed on the top surface of said main body so as to correspond to said protrusions of said sheet tray, and so that said catching lugs of said sheet tray engage with said catching portions of said main body in a manner so that said protrusions of said sheet tray engage with said recessed portions to mount said sheet tray to said main body.

10. The image recording apparatus as claimed in claim 6, wherein said recording sheet discharge portion has a length shorter than a length of the hopper portion,
whereby the leading end portion of a recording sheet upon which recording has been performed and which has been discharged to said recording sheet discharge portion, is received by a hopper portion.

11. The image recording apparatus as claimed in claim 6, wherein a document discharge portion has an opening portion formed on the top surface of said main body side by side with a recording sheet discharge portion of a sheet tray mounted to said main body.

12. The image recording apparatus as claimed in claim 6, wherein said image recording means includes a thermal transfer recording unit having a platen roller, a thermal head and an ink donor film housed in a cassette case, said recording sheet passing with said ink donor film between said platen roller and said thermal head.

* * * * *